July 7, 1964  A. ALVAREZ-CALDERON  3,140,065
HIGH LIFT AND CONTROL SYSTEM FOR AIRCRAFT
Filed June 27, 1962
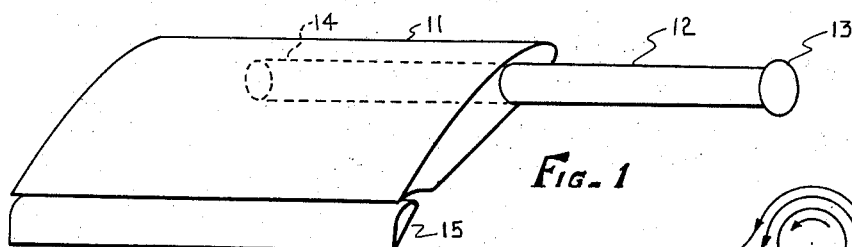
Fig. 1
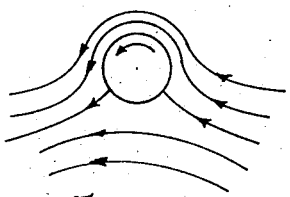
Fig. 1A
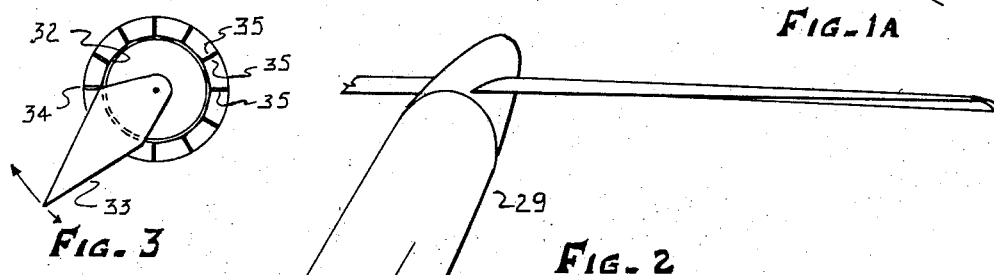
Fig. 3    Fig. 2
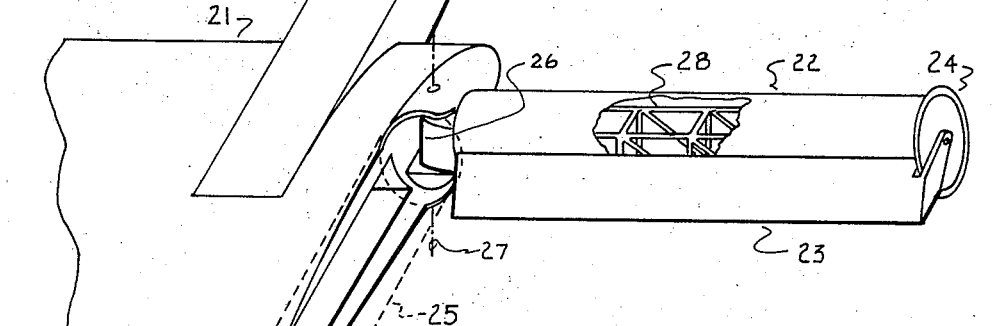
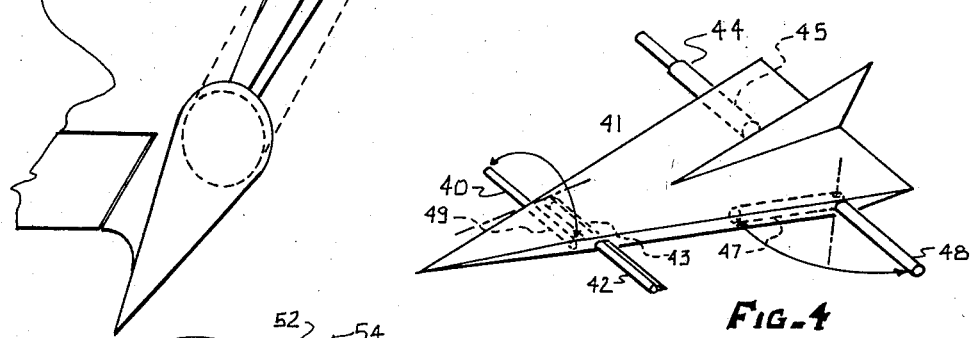
Fig. 4
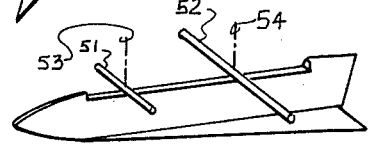
Fig. 5
INVENTOR.
ALBERTO ALVAREZ-CALDERON

3,140,065
HIGH LIFT AND CONTROL SYSTEM FOR AIRCRAFT
Alberto Alvarez-Calderon, 1560 Castilleja St., Palo Alto, Calif.
Filed June 27, 1962, Ser. No. 205,592
17 Claims. (Cl. 244—10)

This invention is a novel method and apparatus for the improved operation of airplanes by the use of rotating cylinders to facilitate short take-off and landing, vertical take-off and landing, and for higher lift and more effective roll control of airplanes. It relates to the structures described and claimed in my previous U.S. patent application Serial 29,656 filed May 17, 1960, and to improvements thereof; this application is a continuation in part of application 29,656, now abandoned.

While rotating cylinders have been considered for some aerodynamic applications in the past, their benefits did not compensate for the complications introduced by the rotating cylinder. The full advantages obtainable from the rotating cylinder were not realized until the discovery which is the subject of my present invention, which shows that great benefits can be obtained by means of some newly discovered arrangements and effects which I shall demonstrate hereafter.

Recent developments and importance of the STOL and VTOL aircraft, as well as the general trend toward higher wing loadings and landing speeds, point to the necessity of high-lift devices and roll control systems which have better aerodynamic characteristics than those provided by geometric modifications of the wings, such as slats, flaps, spoilers and ailerons.

While significant advances have been made in boundary layer control systems based on suction or blowing, no commercial production aircraft exist today depending on these methods for their operation. This indicates that in the practical operation of these systems, the complications still outweigh the merits.

The use of rotating cylinders to obtain certain desirable aerodynamic effects has been suggested before. As early as 1924 in NACA Technical Note No. 209 there was reported "Tests of Rotating Cylinders" in which it was demonstrated experimentally in the U.S. that the combination of translation and circulatory flows resulted in a lift which increased with increase in circulation. Later, in 1926 in NACA Technical Memorandum No. 354 there appeared "Tests for Determining the Effect of a Rotating Cylinder Fitted Into the Leading Edge of an Airplane Wing." It was concluded therein that its effect on lift was practically the same as making a slot in the wing, and that the phenomenon was due to the effect of the cylinder on the velocity of air in the boundary layer on the top of the wing behind the cylinder. Some of the more specific findings are given briefly below.

Measurements of the forces developed by rotating cylinders in the presence of cross flows were made by Prandtl at Goettingen, by the NACA, and by others. Values of lift coefficient of 9.5 based on projected cylinder area have been measured. Lift-drag ratios of the order of 7.8 have been obtained (Ref. NACA TN 209).

The use of a rotating cylinder as a leading edge high-lift device was investigated by E. B. Wolff and C. Koning. From a comparison of this device with the Handley-Page slat it can be observed that both systems produce about the same value of $C_{L_{max}}$ of 2.2 at vastly different angles of attack. (Ref. NACA TM 354 and NACA WR L 263.) The use of rotating cylinders at the trailing edge of wings has been suggested (Ref. British Patent 613,528); no production aircraft has been reported using such a device, however. Many other methods of utilizing rotating cylinders in aircraft are available in U.S. patents of subclass 10, class 244, but these methods, however meritorious, have not resulted in any practical application of the cylinder device.

It is a primary object of my invention to provide improved lift and control of aircraft by the application of rotating cylinders adjacent to the wing's extremities.

It is another object of my invention to obtain superior roll control of an airplane by the use of rotating cylinders in combination with wings to better perform the functions of the usual ailerons, especially at slower aircraft air speeds.

It is still another object of my invention to provide a new roll control device which permits the use of a full span trailing high-lift device, to improve lift characteristics of airplane wings.

Another object of my invention is to provide a high-lift system which increases the wingspan suitable for airplanes capable of high speed flight.

It is a more specific object of my invention to provide some of the superior flying characteristics enumerated above by the use of a mechanical system using rotating cylinder near the wing extremities of aircraft, such as to improve reliability and simplify construction of the device.

I have discovered that improved roll control characteristics may be obtained by cylinders rotating at relatively high speeds located adjacent to conventional wing tips of an airplane at their neutral position, by causing them to emerge into the air flow to produce a rolling moment as desired. Such devices may be referred to as "rotating cylinder ailerons."

I have discovered further that such ailerons provide satisfactory yaw an droll control and therefore permit the use of a full span trailing edge flap on a conventional wing which produces substantially greater lift on the wing independent of the cylinder forces. By an unusual application of a rotating cylinder aileron to provide a down load, I have obtained a roll control system which, unlike conventional ailerons, has favorable yaw due to ailerons.

Referring now to the drawings:

FIG. 1 is an isometric diagram of a fixed airplane wing showing one an arrangement embodying my rotating cylinder ailerons.

FIG. 1a is a sketch showing streamlines of flow around a rotating cylinder which circulation in a uniform stream of infinite height.

FIG. 2 shows an alternate structure of my rotating cylinder aileron incorporating a trailing vane for rapid roll control response.

FIG. 3 shows a cross section of cylinder of FIG. 2.

FIG. 4 shows a peculiar application of my spanwise rotating cylinders to a delta wing aircraft.

FIG. 5 shows one more application of my rotating cylinders to a missile.

Referring now more specifically to FIG. 1, there is seen a wing 11 with a rotating cylinder 12 extending into the air flow to provide a rolling moment and which can be retracted. To improve the aerodynamic efficiency of the cylinder aileron, a cylinder tip plate 13 is shown. The wing trailing edge is shown capable of carrying a full span high-lift trailing edge device 15 which could be used as a flap for landing or partially as an aileron for the higher aircraft speeds.

With the configuration which I have shown I have found that satisfactory roll velocities and helix angles are obtainable. I have found that the magnitude of the rolling moment coefficient at constant r.p.m. of the cylinder tends to increase with decreased aircraft air speed. Helix angle and roll velocity for a given airplane speed may be controlled by varying the r.p.m. or length of cylinder which is exposed to the air flow. The lateral control characteristics are independent of wing stall pattern. Favorable yaw or less adverse yaw may be obtained in roll. There is no aileron reversal problem and full span flaps may be utilized at no sacrifice of roll control or developable lift.

These characteristics of my rotating cylinder ailerons are exemplified by specific calculations on a typical airplane wing of the following characteristics:

Aspect ratio 6 to 1
Rectangular wing of chord C and of span 6C
$S_w$=wing area $6C^2$
Cylinder diameter 0.1C
Cylinder length=1.0C
Arm of cylinder force to center plane of aircraft is 3.2C
Rolling moment=cylinder force×arm
NOTE.—Calculations are for one cylinder fully exposed.
Cylinder force=$C_{L_C} S_c q$ where
$C_{L_C}$ is cylinder left coefficient=9
$S_c$ is cylinder projected area=$0.1C^2$
$q$ is dynamic pressure $$\text{Rolling moment} = 9 \times 0.1C^2 \times q \times 3.2C$$
$$= 2.88 C^3 q$$

Rolling moment coefficient $C_1$, based on wing area and wing span is $$C_1 = \frac{2.88 C^3 q}{q S w \times 6 C q} = 0.08$$

We now calculate the value of the helix angle for the assumed wing: the damping coefficient in roll is, $$C_{1_p} = 0.49$$

(Perkins and Hague, p. 357, FIG. 9, 14). The helix angle is by definition, $$\frac{C_1}{C_{1_p}} = \frac{0.08}{0.49} = 0.163$$

This is twice the recommended minimum.

We now consider the yawing moment due to my rotating cylinder aileron. For this purpose we prescribe one fully exposed single cylinder developing a down force and having a drag coefficient of 1.4 obviously acting to yaw the airplane into the turn. The yawing moment N is, using similar symbols as in previous equation:

$$N = \text{drag force} \times \text{arm}$$
$$= 1.4 \times 0.1 C^2 q \times 3.2C$$
$$= 0.448 C^3 q$$

The yawing moment coefficient $C_n$ based on wing area and wing span is, $$C_n = \frac{N}{6 C_2 \times 6q} = 0.0124$$

favorable.

We therefore conclude that my rotating cylinder aileron is an excellent roll control system.

Evidently, it is possible to use partially exposed cylinders on either or both sides for roll control, or a plurality of small cylinders may be used at each wing tip. The type of flow fields with respect to the cylinder will be obvious to those skilled in the art by inspection of FIG. 1a.

If desired for roll control purposes without the necessity for varying rational speeds or exposed length of the rotating cylinder 12 in FIG. 1, a modified arrangement can be utilized, as illustrated in FIG. 2. As there shown, a wing 21 supports spanwise rotating cylinder 22 with a tip plate 24 of generally similar nature to that described in connection with FIG. 1. In addition, a pivoted vane or flap 23 is positioned adjacent to the rotating cylinder and through control of the angular disposition of this vane 23, rapidlly responsive roll control effects can be attained. For high speed operation of this aircraft, either the interior of the wing is arranged to accommodate both the cylinder 22 and the vane 23 in retracted or withdrawn disposition as indicated in FIG. 1, or it may be pivoted to a chordwise position at the wing tip wherein it is placed as a wing tip tank and as is illustrated by dash line 25 in FIG. 2. Observe in FIG. 2 that the whole rotating cylinder assembly is connected to the wing by a fixed support 26 pivoted at axis 27 to the wing. Tip plate 24 (or a similar one at the cylinder's root), may be foldable into two or more portions of a circle or made flexible like a cloth; it is rigid at high lift by virtue of centrifugal effects of rotation. The cylinder itself should preferably be mounted on a non-rotating cantilever truss or shell internal to the cylinder, as indicated by truss 28. The cylinder may be powered by a gas turbine mounted internal to the cylinder, but preferably it should be connected by a mechanical shaft to the airplane powerplant. A swiveling shaft or a bevel-gear may be used.

In FIG. 2 I show also the installation of my rotating cylinder aileron next to propeller mounted adjacent to the wing tip and aileron: the cylinder aileron is therefore immersed in the propeller slipstream lift and control forces are available in this case independent of forward speed of aircraft. This application is ideal for tilt wing or deflected slipstream V/STOL, not only because control problems are critical in these aircraft, but because the drive of the cylinder aileron can be connected to the propeller shafts on engines very easily in the position shown. The propellers of V/STOL are interconnected anyway, therefore the rotating cylinder ailerons are also interconnected. This aileron and lift system can, therefore, be a purely mechanical system comprising gears, shafts and bearings of conventional design. The components are then reliable and easy to construct.

In FIG. 2, there is also shown that the cylinder aileron is located adjacent to the wing leading edge and ahead of the wing quarter chord or aerodynamic axis. Therefore vertical lifting forces on the aileron can be used to augment lift as well as to counteract negative pitching moment of the trailing edge flap. Furthermore, since the lift of the cylinder depends principally on the ratio of peripheral speed to translational speed rather than aircraft angle of attack, it is evident that the lift force on cylinders will not enter into stability equation with respect to angle of attack. Thus the lift is increased, aileron effectiveness improved, and pitching moments decreased.

For clarity of understanding, the type of rotating cylinder aileron and its associated vane shown in FIG. 2 are shown in cross section in FIG. 3, wherein the cylinder is shown as 32, its tip plate as 34 and its vane at 34. The vane may be placed upstream or downstream of the cylinder, or a double vane generally symmetrical with respect to a vertical plane may be installed. Since the rotating cylinder is circular in cross section, all that is necessary for angular motion of the vane is to have it pivotally hinged to the cylinder support structure coincident to the axis of rotation, as shown. Tip plate is shown made of many hinged petals 35.

The retractable rotating cylinder 82 of FIGS. 1 and 2 can take the specific form illustrated in FIGS. 4 and 5.

With reference to FIG. 4, rotating cylinders of the type described are shown in an exemplary application to delta wing aircraft. The delta wing aircraft 41 can mount rotating cylinders 42 and 43 for sliding retraction into its body or cylinders 44 into telescopic retraction, as indicated at 45, or turning cylinder 48 with pivoted retraction, as indicated at dash line 47 and by pivoted cylinder 40 shown at dotted lines 49. Through the use of such rotating cylinders of any of the described types, the lift forces for landing of the delta wing aircraft 41 can be substantially doubled and more effective control of pitch and roll can be achieved at the low landing or take-off speeds. The cylinders shown may be equipped with vanes of the type of FIG. 3.

In FIG. 5, rotating cylinders 51, 52 are positioned on a flying body for the production of lifting forces, but can be pivoted about vertical axes, indicated at 53, and 54 for aligned relationship with the body when under high speed flight conditions.

The construction of rotating cylinder ailerons present no special problem to those skilled in the art. Apart from the references already mentioned in the specifications, and the description and illustrations shown in the invention, there are evidently other methods of constructing and powering the rotating cylinders. For example, the retractable cylinder aileron 12 of FIG. 1 can be rotated by an electric motor, an air turbine with compressed air, or by an air wheel mounted on the cylinder's outboard end which uses the relative air stream past the aircraft to impart rotational motion to the cylinder. Such air wheels mounted on the tips of rotating cylinders have been proposed in the past, see for instance FIG. 3 and FIG. 4 of U.S. Patent No.1,875,276. Cylinder 12 may retract and extend by use of known extending and retracting mechanisms for rotating cylinders. See for instance FIGS. 11 and 12 of U.S. Patent No. 1,927,538 wherein rotating cylinder 50 is displaced axially with respect to an axial support 58.

While I have shown several preferred embodiments of my invention herein, it is understood that many other variations in form, arrangement, and operation may be made without departing from the spirit of my invention and I do not hereby limit myself in scope except as I do so in the claims.

I claim:

1. In an aircraft comprising an air frame having a longitudinal axis substantially aligned with the normal direction of horizontal flight of said aircraft and lift producing surfaces on said air frame distributed substantially equally on opposite sides of said axis and power means for generating an air stream across said lift producing surfaces, the improved means for controlling the lift on said air frame substantially independent of aircraft angle of attack comprising: at least two cylinders mounted on said air frame on opposite sides of said axis and adjacent to edge portions of said lift producing surfaces remote from said axis, said cylinders being movable in rotation about their longitudinal axis when operative; said cylinders being adapted to be moved between operative and inoperative positions, each of said cylinders in its operative position having its area, projected on a plane parallel to its axis, positioned to intercept said air stream outboard from said edge portion of said lift producing surface to produce a force of a fixed orientation relative to the airstream and substantially independent of the angle of attack of said aircraft, and each of said cylinders in its inoperative position having said projected area positioned in substantially non-interfering relation with said air stream.

2. The improved aircraft of claim 1 characterized further by the inclusion of means for supporting said cylinders in said operative position in a cantilevered position extending from said airframe adjacent to and outboard from said edge portion of said lift producing surface.

3. The improved aircraft of claim 1 in which each of said lift producing surfaces has a trailing edge portion extending from a point adjacent to said longitudinal axis to a point adjacent to said remote portions of said lift producing surface, a high lift flap is provided on the trailing edge of each of said lift producing surfaces and extending substantially from said point adjacent to said longitudinal axis to said remote portion of said lift producing surface, said flaps being adapted to be moved from a high speed trailing position when said cylinders are inoperative to a high lift, flap deflected positions when said cylinders are in said operative positions, with said flaps being adapted to be moved independently of each other when said cylinders are in said inoperative positions.

4. The improved aircraft of claim 1 characterized further by the inclusion of means for changing the effective lift of said cylinders independently of each other.

5. The improved aircraft of claim 1 in which said air frame has wing tip edge portions positioned on opposite sides of said axis and facing generally away from said axis, and in which said cylinders are mounted in said air frame adjacent to said remote portions of said lift surface and said means for moving said cylinders comprises means for moving each of said cylinders out of said air frame adjacent to said remote portions of said lift surface along a path generally parallel to the axis of said cylinder.

6. The improved aircraft of claim 5 in which said path extends generally parallel to the axis of said cylinder and lies generally perpendicular to the air stream direction relative said cylinder when said cylinder is in said operative position.

7. The aircraft of claim 1 further characterized in that said lift producing surfaces have an overall spanwise dimension generally perpendicular to said normal direction of horizontal flight, and lifting surface edges remote from said longitudinal axis and inclined at a substantial angle to said spanwise dimension; and in that each of said cylinders in its inoperative position has its long dimension substantially parallel to one of said lifting surface edges.

8. The aircraft of claim 7 further characterized in that said cylinder in said inoperative position is adapted to be faired to said spanwise edge.

9. For an aircraft wing having a wing tip portion with a tip edge generally parallel to the normal direction of flight of said aircraft, the improvement comprising a cylinder having a long dimension and capable of rotating about an axis parallel to its long dimension, means mounting said cylinder adjacent to said tip edge for motion of said cylinder between an operative position in which said cylinder is positioned beyond said tip edge in a generally horizontal position and generally perpendicular to said normal direction of flight, and an inoperative position in which said cylinder is adapted to be faired in a location adjacent to said tip edge and with the long dimension of said cylinder substantially parallel to said tip edge.

10. The aircraft of claim 9 further characterized in that said wing has a full span trailing edge flap substantially all of which is deflected downwards by a substantial angle when said cylinder is in said operative position, and at least a part of which can be moved upwards and downwards when said cylinder is in said inoperative position whereby said aircraft is rendered capable of very high lift at slow speeds and excellent control at high speeds.

11. The structure of claim 9 further characterized in that a propeller is mounted on said wing with its axis adjacent and substantially parallel to said tip edge and with a substantial portion of the disc of said propeller being located ahead of said cylinder with the slipstream of said portion of the propeller disc being directed towards said cylinder.

12. The structure of claim 11 further characterized in that said cylinder is connected mechanically to the axis of said propeller for rotation about said cylinder axis.

13. The structure of claim 12 further characterized in that said wing is a variable incidence wing with respect to the fuselage of said aircraft, and in that said wing has at least two propellers mechanically interconnected for synchronized rotation.

14. The aircraft of claim 1 further characterized in that each of said cylinders is supported by a cantilever structural member extending inside said cylinder and supporting said cylinder for rotation of said cylinder with respect to said cantilever structural member.

15. In an airplane having fixed wings with side edges the improved system of roll control and high lift comprising means for projecting rotating cylinders out beyond the side edges of said wings and into the relative air flow of said airplane and means for withdrawing said rotating cylinders to a position adjacent to said wing edges.

16. For aircraft a wing having a pair of tip edge portions, a pair of rotating cylinder ailerons mounted one on each of said tip portions, with one of said cylinders being adapted to be moved outboard from an inoperative retracted position faired adjacent to said tip portion to an operative position outboard and beyond said tip portion, in which operative position the lower surface of said cylinder moves in the same direction as the relative airstream to introduce a downward force to said cylinder, said cylinder experiencing a drag force tending to yaw backwards the wing tip portion which supports said operative cylinder whereby said wing yaws favorably into the side of the turn produced by said operative rotating cylinder aileron.

17. The structure of claim 4 further characterized in that said means to change said effective lift comprise a pair of vanes connected one to each of said cylinders and adapted to be oriented with respect to said airstream independently of the rotational motion of said cylinder and the angle of attack of said aircraft.

References Cited in the file of this patent
UNITED STATES PATENTS

| | | |
|---|---|---|
| 1,890,064 | Medvedeff | Dec. 6, 1932 |
| 1,927,538 | Zaparka | Sept. 19, 1933 |
| 3,025,026 | Nichols | Mar. 13, 1962 |